UNITED STATES PATENT OFFICE.

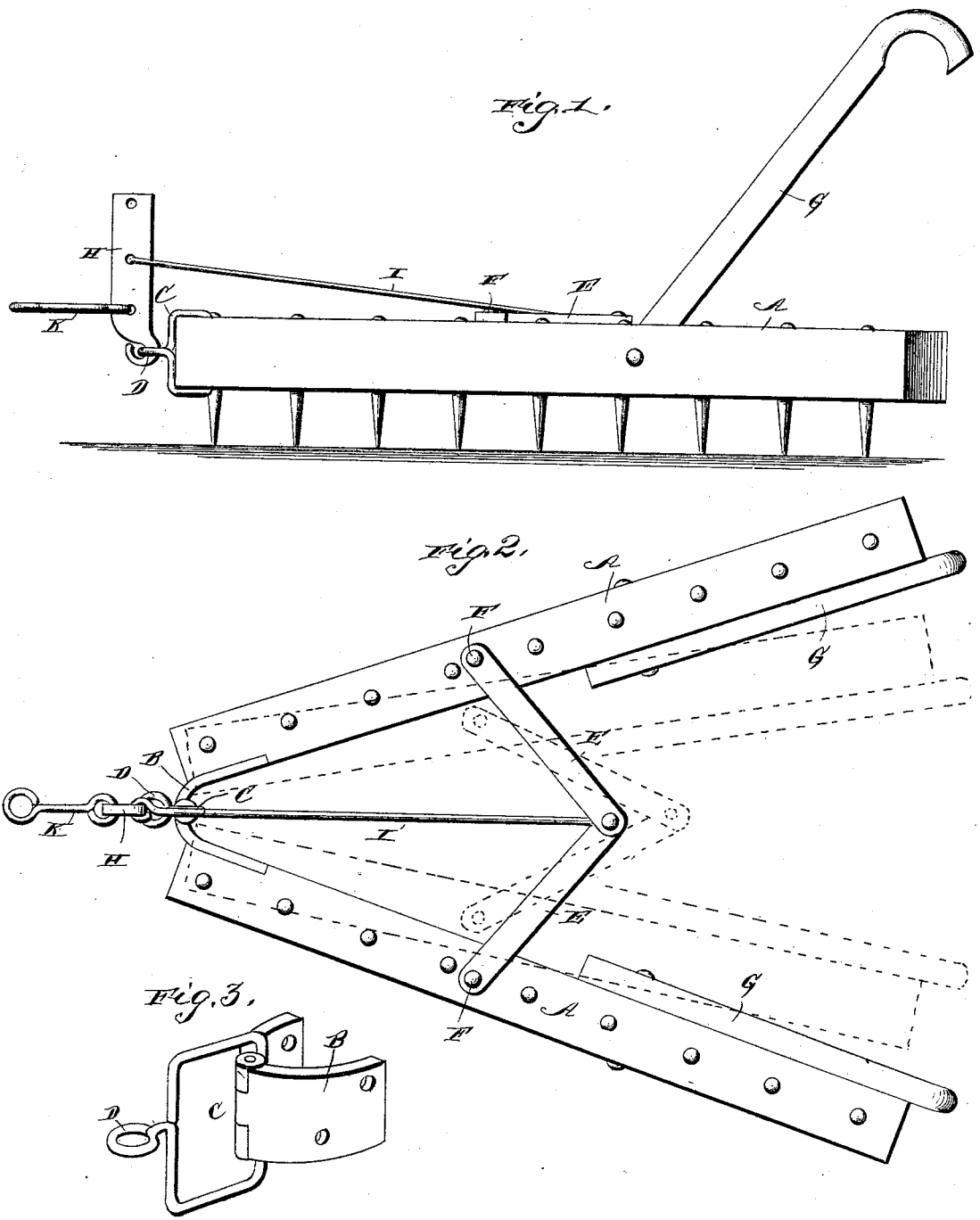

LOUIS FERDINAND HARTMAN, OF CAVE SPRINGS, KANSAS.

HARROW OR CULTIVATOR.

SPECIFICATION forming part of Letters Patent No. 370,138, dated September 20, 1887.

Application filed May 5, 1887. Serial No. 237,260. (No model.)

*To all whom it may concern:*

Be it known that I, LOUIS FERDINAND HARTMAN, a citizen of the United States, residing at Cave Springs, in the county of Elk and State of Kansas, have invented a new and useful Improvement in Harrows or Cultivators, of which the following is a specification.

My invention relates to an improvement in harrows or cultivators; and it consists in the peculiar construction and combination of devices that will be more fully set forth hereinafter, and particularly pointed out in the claims.

In the drawings, Figure 1 is a side elevation of my invention. Fig. 2 is a top plan view of the same. Fig. 3 is a detail view of the hinge.

A represents a pair of beams, which form the sides of a V-shaped harrow or cultivator frame, and B represents a hinge which connects the front ends of the said beams together. To this hinge is attached a loop, C, which is provided with a forwardly-projecting horizontal ring or eye, D.

E represents a pair of toggle-jointed bars, which have their outer ends pivoted to the upper side of the beams A at a suitable distance from the front ends thereof by means of bolts F.

G represents a pair of handles, which are similar to plow-handles. One of the said handles is attached to the inner side of each beam A, and are adapted to be grasped by the operator and employed to direct the harrow or cultivator and expand or contract the same by moving the beams A toward or from each other, according to the width of the row.

H represents a vertical bar, which constitutes a clevis, and has its lower end hooked to the ring or eye D. This bar is provided with a vertical series of transverse openings.

I represents a rod which connects the jointed ends of the bars E, and the front end of said rod is hooked to one of the openings in the clevis-bar H.

K represents a draft-rod, which is hooked to the clevis-bar H at a point between the outer end of the rod I and the lower end of the clevis-bar H, and the said draft-rod is provided at its front end with a ring, whereby a whiffletree or singletree may be attached thereto. Harrow or cultivator teeth are attached to the beams A and depend from the same.

The operation of my invention is as follows: When the machine is drawn forward, the clevis-bar H tends to incline forward and thereby cause the meeting ends of the toggle-jointed bars E to move forward, and thus cause the beams A to expand or move apart laterally. This tendency of the beams to move laterally apart is resisted by the draft or strain upon the harrow or cultivator teeth running in the ground, and the result is that the drawing strain upon the harrow or cultivator is supplied partly to the hinge at the front end of the beam and partly to the toggle-jointed bars which connect the beams, thereby applying side draft to the harrow or cultivator frame. By thus distributing the draft on the frame the strain on the forward part of the latter is to a very great extent relieved, and the beams A are adapted to be moved toward or from each other by the operator with ease.

Having thus described my invention, I claim—

1. The harrow or cultivator frame, comprising the beams A, hinged together at their front ends, in combination with the clevis-bar H, the jointed toggle-bars E, connecting the beams A, and the rod I, connecting the said toggle-bars to the clevis-bar, for the purpose set forth, substantially as described.

2. The combination of the beams A, hinged together at their front ends, the toggle-jointed bars E, connecting the said beams, the clevis-bar connected to the front end of the frame and provided with the vertical series of openings, and the rod I, having its rear end attached to the toggle-jointed bars, and adapted to engage the clevis-bar at any desired vertical adjustment thereon, substantially as described.

3. The combination of the beams A, the hinge B, connecting the front ends of the same, the loop C attached to the hinge, the clevis-bar H attached to the loop C, the toggle-jointed levers connecting the beams, and the rod I, connecting the said levers with the clevis-bar, substantially as set forth.

In testimony that I claim the foregoing as my own I have hereto affixed my signature in presence of two witnesses.

LOUIS FERDINAND HARTMAN.

Witnesses:
J. F. PEBLEY,
J. W. CRISMES.